United States Patent
Miranda et al.

(10) Patent No.: US 12,316,752 B2
(45) Date of Patent: May 27, 2025

(54) POLYNOMIAL FUNCTION SECRET SHARING

(71) Applicant: Seagate Technology LLC, Fremont, CA (US)

(72) Inventors: Nolan Miranda, Winston-Salem, NC (US); Vipin Singh Sehrawat, Shugart (SG); Foo Yee Yeo, Shugart (SG)

(73) Assignee: SEAGATE TECHNOLOGY LLC, Fremont, CA (US)

(*) Notice: Subject to any disclaimer, the term of this patent is extended or adjusted under 35 U.S.C. 154(b) by 121 days.

(21) Appl. No.: 17/490,965

(22) Filed: Sep. 30, 2021

(65) Prior Publication Data
US 2023/0102012 A1   Mar. 30, 2023

(51) Int. Cl.
*H04L 9/08* (2006.01)
(52) U.S. Cl.
CPC .................... *H04L 9/085* (2013.01)
(58) Field of Classification Search
None
See application file for complete search history.

(56) References Cited

U.S. PATENT DOCUMENTS

| | | | | |
|---|---|---|---|---|
| 6,810,122 B1* | 10/2004 | Miyazaki | ............... | H04L 9/085 380/42 |
| 9,667,416 B1* | 5/2017 | Machani | ............... | H04L 9/3215 |
| 9,813,243 B1* | 11/2017 | Triandopoulos | ...... | H04L 63/061 |
| 2010/0054480 A1* | 3/2010 | Schneider | ............... | H04L 9/085 380/283 |
| 2014/0173270 A1* | 6/2014 | Matsuo | ............... | H04L 63/0428 713/150 |
| 2017/0228547 A1* | 8/2017 | Smith | ................. | H04L 63/0428 |
| 2019/0260667 A1* | 8/2019 | Aguado Martín | .... | H04L 9/0825 |
| 2020/0186356 A1* | 6/2020 | Veeningen | .............. | H04L 9/008 |

(Continued)

OTHER PUBLICATIONS

Boyle et al. Secure Computation with Preprocessing via Function Secret Sharing, Sep. 29, 2019, Cryptography ePrint Archive, pp. 1-31 (Year: 2019).*

(Continued)

*Primary Examiner* — Saleh Najjar
*Assistant Examiner* — Shadi H Kobrosli
(74) *Attorney, Agent, or Firm* — HOLZER PATEL DRENNAN

(57) ABSTRACT

Polynomial function secret sharing provides for computation of reconstruction share results for a polynomial function on an input. An allocatable share of the polynomial function is received at a computing system of the share result computation systems. The allocatable share is generated from the polynomial function. Each of the allocatable shares is distributed to a unique share result computation system of the share result computation systems. Each allocatable share includes a share element for each coefficient in the polynomial function, wherein the share elements for a coefficient across the share result computation systems summing to the coefficient. A reconstruction share result is generated at the computing system by computing a dot product of the input and the allocatable share received by the computing system. A combination of the reconstruction share results generated by the share result computation systems yields a reconstructed result of the polynomial function on the input.

17 Claims, 6 Drawing Sheets

(56) References Cited

U.S. PATENT DOCUMENTS

| | | | | |
|---|---|---|---|---|
| 2020/0259651 | A1* | 8/2020 | Mohassel | H04L 9/085 |
| 2020/0387777 | A1* | 12/2020 | Avestimehr | G06N 20/20 |
| 2021/0167946 | A1* | 6/2021 | Bitan | H04L 9/085 |
| 2021/0184855 | A1* | 6/2021 | Joseph | G06Q 20/3674 |
| 2022/0231831 | A1* | 7/2022 | Schneider | H04L 9/003 |
| 2022/0374544 | A1* | 11/2022 | Polychroniadou | H04L 9/3247 |
| 2024/0178989 | A1* | 5/2024 | Dolev | G06N 3/02 |

OTHER PUBLICATIONS

Koshiba, Takeshi; Fourier-based Function Secret Sharing with General Access Structure; Dec. 3, 2017; pp. 1-12 (Year: 2017).*

Abraham et al. Polynomial Secret Sharing and the Lagrange Basis; Jul. 17, 2020; Github: Decentralized Thoughts (Year: 2020).*

Paskin-Cherniavsky et al. On Polynomial Secret Sharing Schemes; Jun. 2020; pp. 1-45 (Year: 2020).*

D. Yuan, M. He, S. Zeng, X. Li and L. Lu, "(t,p)—Threshold Point Function Secret Sharing Scheme Based on Polynomial Interpolation and Its Application," 2016 IEEE/ACM 9th International Conference on Utility and Cloud Computing (UCC), Shanghai, China, 2016, pp. 269-275. (Year: 2016).*

J. Luo, L. F. Zhang, F. Lin and C. Lin, "Efficient Threshold Function Secret Sharing With Information—Theoretic Security," in IEEE Access, vol. 8, pp. 6523-6532, 2020, doi: 10.1109/ACCESS.2019.2963677 (Year: 2020).*

Boyle, Elette, et al., "Function Secret Sharing", International Association for Cryptologic Research: Eurocrypt 2015, Part II, LNCS 9057, 2015, 337-367.

Boyle, Elette, et al., "Function Secret Sharing: Improvements and Extensions", CCS '16: Proceedings of the 2016 ACM SIGSAC Conference on Computer Communications Security, Oct. 2016, 1292-1303.

Boyle, Elette, et al., "Secure computation with preprocessing via function secret sharing", TCC, 2019, 341-371.

Koshiba, Takeshi, "Fourier-based Function Secret Sharing with General Access Structure", arXiv:1712.00735, Dec. 3, 2017.

Luo, J., "Efficient Threshold Function Secret Sharing With Information—Theoretic Security", IEEE Access, vol. 8, Jan. 3, 2020, 6523-6532.

Shamir, Adi, "How to share a secret", Communications of the ACM, vol. 22, Issue 11, Nov. 1979, 612-613.

Wang, Frank, et al., "Splinter: Practical Private Queries on Public Data", 14th {USENIX} Symposium on Networked Systems Design and Implementation, 2017.

* cited by examiner

POLYNOMIAL FUNCTION SECRET SHARING

SUMMARY

The described technology provides methods and systems for polynomial function secret sharing by share result computation systems participating in computation of reconstruction share results for a polynomial function on an input. An allocatable share of the polynomial function is received at a first computing system of the share result computation systems. The allocatable share is a member of a set of allocatable shares generated from the polynomial function. Each of the allocatable shares is distributed to a unique share result computation system of the share result computation systems. Each allocatable share includes a share element for each coefficient in the polynomial function, wherein the share elements for a coefficient across the share result computation systems summing to the coefficient. A reconstruction share result is generated at the first computing system by computing a dot product of the input and the allocatable share received by the first computing system, wherein a combination of the reconstruction share results generated by the share result computation systems yields a reconstructed result of the polynomial function on the input. The reconstruction share result is transmitted to another computing system for computation of the reconstructed result.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
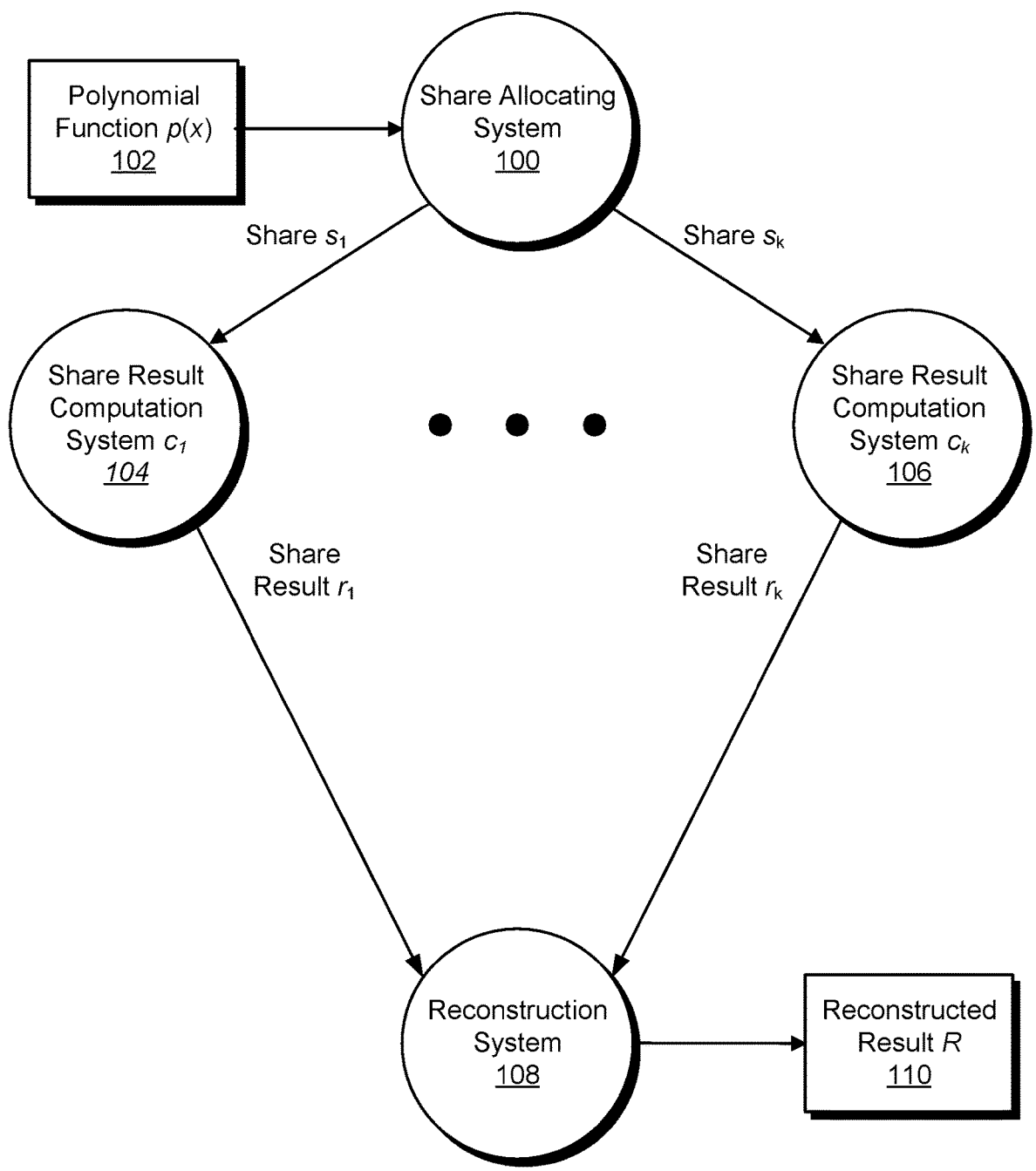
FIG. 1 illustrates example electronic systems useful in polynomial function secret sharing.

In some computing scenarios, a data owner may wish to outsource storage to multiple third party servers. If the data owner wishes to compute a function $f$ on the stored data without revealing the function, then techniques such as homomorphic encryption and multiparty computation (MPC) are not appropriate solutions because these methods require the function to be known to at least one computing entity. In contrast, function secret sharing (FSS), with appropriate constraints and computational operations, can allow a set of parties (e.g., computing servers) to evaluate a function in an oblivious manner, maintaining the secrecy of the function $f$ with respect to these parties.

A capability of employing multiple parties to evaluate a function $f$ without any of the parties knowing $f$ itself has many direct applications, including without limitation:
  Searching over encrypted data without requiring decryption,
  Retrieving data from servers without revealing what was retrieved, and
  Privately extracting sensitive information from a pool of seemingly innocuous data.

The described technology provides for such oblivious computing of a polynomial function p with optimal space overhead. In one example, a cloud storage system may offer services for performing private evaluation of polynomial functions. A customer may wish to compute on some data that is stored in the cloud, wherein the computational function itself may include confidential information (e.g., a proprietary algorithm, trade secret information of a customer or other party). By using the implementations of function secret sharing on a polynomial function described herein, such computation can be performed by multiple parties (e.g., computing servers) while preserving the secrecy of the function itself. Moreover, the described technology provides robust function secret sharing for the wide range of polynomial functions, thereby supporting secret function computation for most needs.

In another example, a customer may wish to perform efficient searches over encrypted data. A naïve approach to search over encrypted data is to "first decrypt, then search," a time and resource-intensive sequence of operations (e.g., decrypting an entire database for a simple search can introduce excessive computational and/or storage overhead). Hence, the polynomial function secret sharing described herein can be used to perform searches over encrypted data without requiring prior decryption of the data.

The described technology also does not introduce certain undesirable limitations, including without limitation:
  Conditional security and privacy, i.e., security and privacy guarantees that rely on some hardness assumption(s), and
  Sub-optimal space overhead, i.e., the share size (e.g., the number of parties with which the function components are shared) is larger than is available or optimal in appropriate use cases.

Accordingly, the described technology provides improvements over existing computing technology for one or more of the foregoing or other reasons without limitation: at least increasing the applicable function scope, adding computation of encrypted data without decrypting the data, and reducing undesirable computational limitations and conditions.

FIG. 1 illustrates example electronic systems useful in polynomial function secret sharing. A share allocating system possesses a polynomial function p(x). Polynomial function secret sharing is directed to sharing the polynomial function p(x) among two or more share result computation systems, such that the share result computation systems can jointly evaluate their respective shares of the polynomial function p(x) without the complete function p(x) being shared with any computing system (e.g., without the complete function p(x) being shared with a share result computation system or a reconstruction system). Each function share of p(x) is identified as $s_i$ for i=1, . . . , k, where k is the number of share result computation systems used in this polynomial function secret sharing operation. Each share result computation system computes a combined result share $r_i$, of a corresponding $s_i$ function share on specified input data y. The complete result of the polynomial function p(x) (identified as a reconstructed result R) can then be reconstructed from the combined result shares r from each participating share result computation system (1 through k).

For example, in one implementation, a share allocation system 100 allocates specifically computed shares s of the polynomial function p(x) 102 to two or more share result computation systems (see, e.g., a share result computation system 104 and a share result computation system 106). Because the share result computation systems do not receive the entire polynomial function p(x), they cannot discern the entire polynomial function by themselves.

The combined result shares r computed by the share result computation systems can then be received by a reconstruction system 108 (which can be in the form of a share allocation system, a share result computation system, or another electronic system), and the complete result of the polynomial function secret sharing operation can be reconstructed from the combined result shares r of the share result computation systems. That is, the combined result shares of each share result computation system can be further combined according to a reconstruction protocol to yield the full result R (reconstructed result R 110) of the polynomial function p(x) without any other computing system (e.g., other than the share allocating system) having access to the complete polynomial function p(x). The following descriptions provide more formal statements of example implementation of the polynomial function secret sharing articulated herein.

Figure 2:
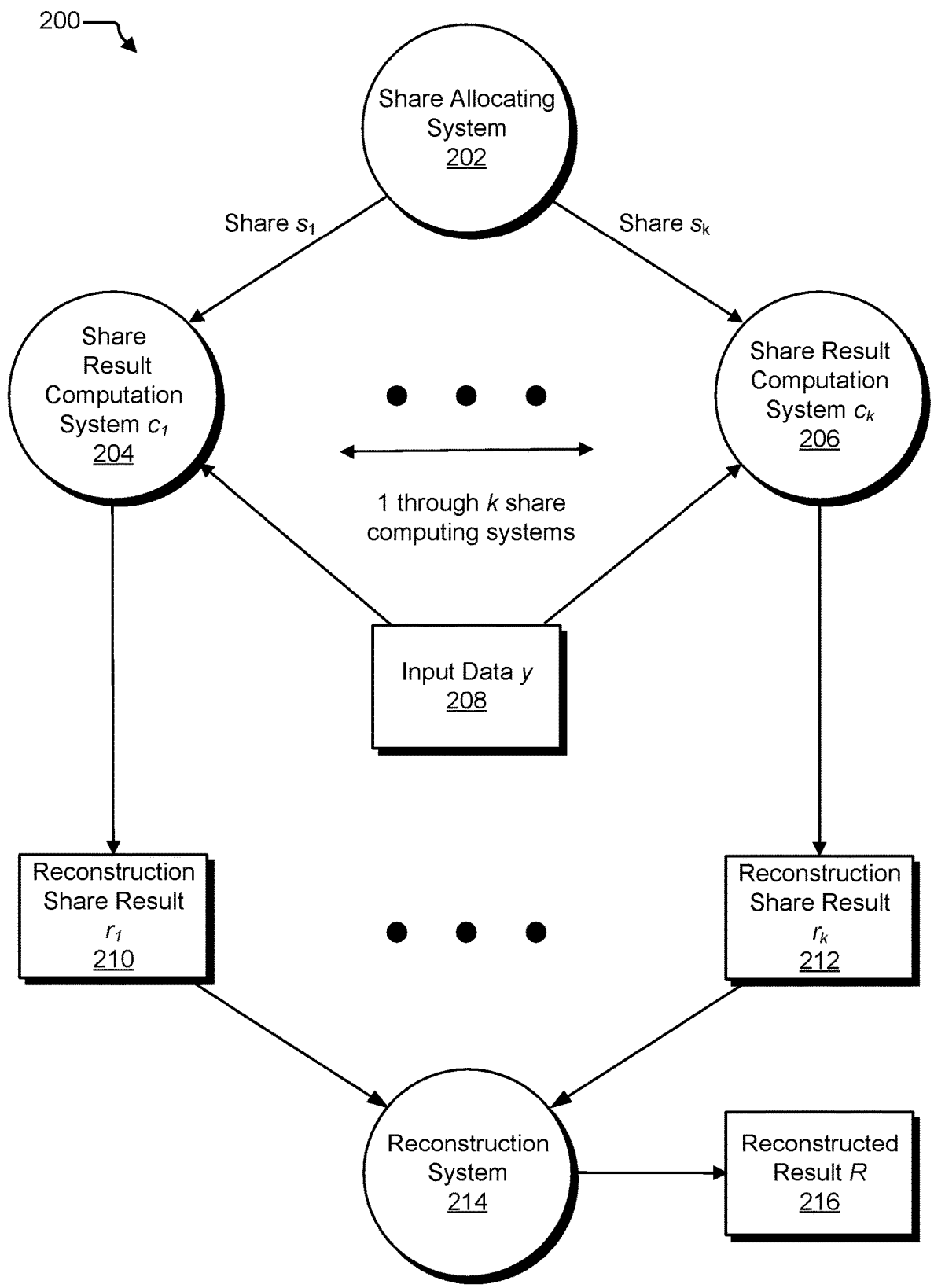
FIG. 2 illustrates a polynomial function secret sharing system generating a result of a polynomial function from result shares computed by two or more share result computation systems.

FIG. 2 illustrates a polynomial function secret sharing system 200 generating a result of a polynomial function from result shares computed by two or more share result computation systems. The technology described herein applies, without limitation, to threshold and non-threshold implementations. In non-threshold implementation, share results of all of the share result computation systems (to which polynomial function shares are allocated) are needed to fully reconstruct the result of the full polynomial function. In a threshold implementation, a proper subset of the share result computation systems (e.g., a threshold number of the share result computation systems less than all of the share result computation systems) can be used to fully reconstruct the result of the full polynomial function.

In a non-threshold scheme, a share allocation system 202 computes shares of a polynomial function p(x) with degree d and coefficients $a_d, a_{d-1}, \ldots, a_1, a_0$ for the terms $x^d$, $x^{d-1}, \ldots,$ and 1 respectively. Accordingly, the polynomial function p(x) can be written as:

$$p(x) = a_d x^d + a_{d-1} x^{d-1} + \ldots + a_1 x + a_0$$

Let k be the number of share result computation systems (e.g., share result computation systems 204 and share result computation systems 206) among which the share allocation system 202 (also referred to as a "dealer") is to share the polynomial function p(x). The share result computation systems can also be identified as $c_1, c_2, \ldots, c_k$. Let y be the desired input data 208.

For each $a_j$ from j=0 to d (in other words, for each coefficient of the polynomial function p(x)), the share allocation system 202 randomly picks k numbers (deemed "share elements") that sum to the coefficient $a_j$. Each of these will be the share of $a_j$ for share result computation system $c_i$, where i goes from 1 to k. Denote these shares as $s_{i,j}$ (the share for share result computation system $c_i$ for the coefficient $a_j$). Note that each share result computation system $c_i$ will receive d+1 shares, one for each coefficient $a_j$ in the polynomial function p(x). The share result computation systems also receive input data y, the specified input to the polynomial function p(x) for use in the evaluation.

Having received their corresponding shares and the input data y, each share result computation system $c_i$ then computes the individual share results $r_{i,j}$ of each of its polynomial function shares $s_{i,j}$ of the polynomial function p(x) and combines these individual share results $r_{i,j}$ to yield a combined share result $r_i$ (also referred to as a "reconstruction share result"). In one implementation, each share result computation system $c_i$ takes each of their shares $s_{i,j}$, where j goes from 0 to d, and multiplies it by $x^j$ to yield the individual share results $r_{i,j}$ then adds all of the individual share results $r_{i,j}$ to yield the combined share result $r_i$. Although other computations are contemplated, this implementation computes the combined share result $r_i$ as a dot product:

$$r_i = \langle s_{i,0}, s_{i,1}, s_{i,2}, \ldots, s_{i,d} \rangle \cdot \langle y^0, y^1, y^2, \ldots, y^d \rangle = s_{i,d} y^d + s_{i,d-1} y^{d-1} + \ldots + s^{i,1} x + s^{i,0}$$

The combined share result $r_i$ is the reconstruction share result (e.g., a reconstruction share result $r_1$ 210 and a reconstruction share result $r_k$ 212) that each share result computation system $c_i$ contributes to a reconstruction protocol that will yield the reconstructed result R (e.g., the reconstructed result 216) of the full polynomial function p(x) with input data y. Upon reconstruction, a reconstruction system 214 combines $r_i$ of the share result computation systems $c_i$ for i=1 through k) add up all of the $r_i$ results, which will equal p(x) with input data y. Accordingly, in a non-threshold case, the sum of all of the $r_i$ results equals the reconstructed result R. It should be understood that the reconstruction system may be in the form of a share allocation system, a share result computation system, and/or another electronic system.

In one or more implementations, the coefficients are members of a finite or Galois field. However, for simplicity of description, the following example is provided with the coefficients taking the form of integers. The teachings of the example below can be extended to a finite or Galois field. Given a polynomial function p(x) to be shared among 3 share result computation systems, where $$p(x) = 6x^3 + 14x^2 - 4x + 9,$$

the share elements for each coefficient may be computed and allocated as follows:

$a_3=6$ can be randomly broken up into $s_{1,3}=3$, $s_{2,3}=2$, and $s_{3,3}=1$, one for each share computing system;

$a_2=14$ can be randomly broken up into $s_{1,2}=9$, $s_{2,2}=1$, and $s_{3,2}=4$, one for each share computing system;

$a_1=-4$ can be randomly broken up into $s_{1,1}=-1$, $s_{2,1}=-6$, and $s_{3,1}=3$, one for each share computing system; and $a_0=9$ can be randomly broken up into $s_{1,0}=6$, $s_{2,0}=-4$, and $s_{3,0}=7$, one for each share computing system.

Given the example share elements give above, then the individual share result computations system will receive, in addition to the input y, the following shares:

$c_1$ receives share $s_1=[1, 4, 3, 7]$;
$c_2$ receives share $s_2=[2, 1, -6, -4]$; and
$c_3$ receives share $s_3=[3, 9, -1, 6]$.

Given an input y=5, then each share result computation system computes the dot product $\langle s_{i,0}, s_{i,2}, \ldots, s_{i,d} \rangle \cdot \langle y^0, y^1, y^2, \ldots, y^d \rangle$ of the input and its share, yielding reconstruction share results as follows in this example:

$c_1$ computes $(1*125+4*25+3*5+7*1)=247$;
$c_2$ computes $(1*125+1*25+(-6)*5+(-4)*1)=241$; and
$c_3$ computes $(3*125+9*25+(-1)*5+6*1)=601$.

In the non-threshold case, the sum of these reconstruction share results, as computed by a reconstruction system equals 1089, which means $p(y)=6y^3+14y^2-4y+9$, where $y=5$, equals 1089. However, because the reconstruction system only obtains a single point on the original polynomial p, it cannot determine the full polynomial p, and therefore, the original polynomial remains a secret."

In a threshold case, a threshold number (less than k) of the reconstruction share results are sufficient to reconstruct the reconstructed result R. In a threshold case, rather than an additive reconstruction protocol (as an example used in the non-threshold case), one or more other reconstruction protocols may be employed over finite fields, such as the Shamir shares protocol, which relies on Lagrange interpolation and modular arithmetic.

Accordingly, in an example implementation of Shamir shares, a share allocating system shares each coefficient $a_j$ of the polynomial p using Shamir shares, such that the i-th share result computation system $c_i$ receives $s_{i,j}$. In this case, $s_{1,j}, \ldots, s_{k,j}$ are Shamir shares of $a_j$. To compute the Shamir shares $s_{1,j}, \ldots, s_{k,j}$, a random polynomial $q_j(x)$ (unrelated to p), $q_j(0)=a_j$ is chosen, wherein $s_{ij}=q_j(i)$.

The computation of the share results may be computed as described in the non-threshold case. A reconstruction system then reconstructs the full result Q using Shamir's reconstruction, wherein, for a threshold of t=3 (as an example):

$$Q(y) = \sum_{i=1}^{t} \left( \prod_{\substack{0 \le j \le t \\ j \ne i}} \frac{y-j}{i-j} \right) s_i$$

Figure 3:
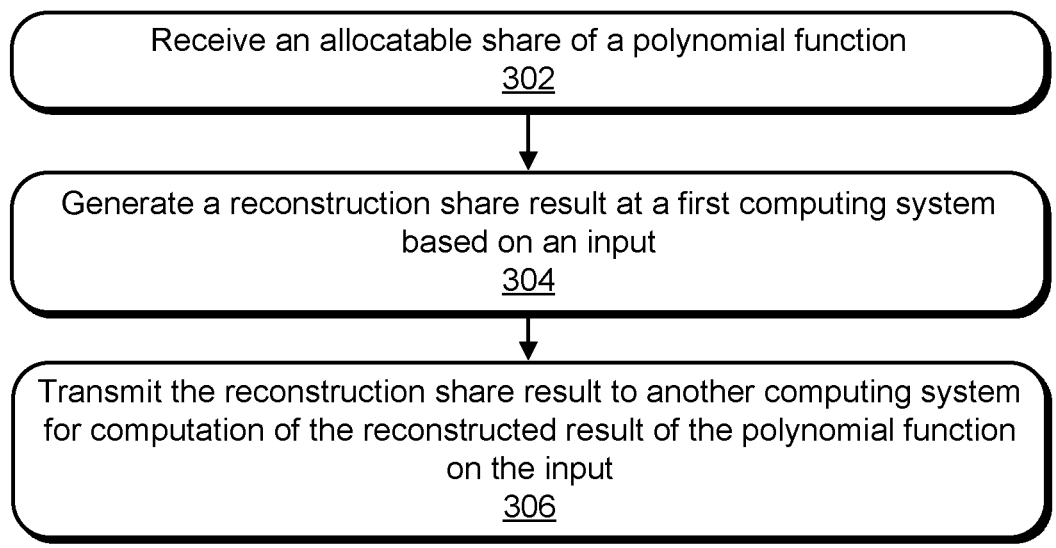
FIG. 3 illustrates example operations for polynomial function secret sharing at a share result computation system.

Given the description above, by setting above, by setting y to zero, the secret coefficient $q_j(0)=a_j$ may be computed for use in computing the Shamir shares that are allocated to share result computation systems in a threshold case. (Note: An alternative constant, different than zero, may be employed with a similar result—zero was selected in this example for simplicity.) As such, with this approach, only the threshold number of reconstruction share results are needed to determine Q(y), although more may be used. Other reconstruction techniques may be employed FIG. 3 illustrates example operations 300 for polynomial function secret sharing at a share result computation system. A receiving operation 302 receives an allocatable share of a polynomial function, such as through a communication interface. In one implementation, one or more other share result computation systems receive different shares of the polynomial function as well. The allocatable share is a member of a set of allocatable shares generated from the polynomial function generated by a share allocation system. Each of the allocatable shares has been distributed from the share allocation system to a unique share result computation system of the share result computation systems. Each allocatable share includes a share element for each coefficient in the polynomial function, and the share elements for a coefficient across the share result computation systems sum to the coefficient.

A generating operation 304 generates a reconstruction share at a first computing system based on an input. A combination of the reconstruction share results generated by the share result computation systems yields a reconstructed result of the polynomial function on the input. A communication operation 306 transmits the reconstruction share result to another computing system for computation of the reconstructed result of the polynomial function on the input.

Figure 4:
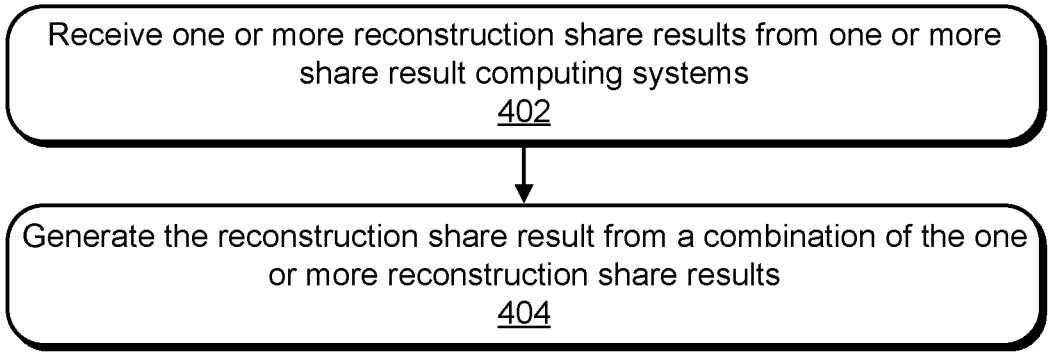
FIG. 4 illustrates example operations for polynomial function secret sharing at a reconstruction system.

FIG. 4 illustrates example operations 400 for polynomial function secret sharing at a reconstruction system. A receiving operation 402 receives one or more reconstruction share results via a communication interface at a reconstruction system from one or more share result computation systems. Each reconstruction share result includes a dot product of the input and an allocatable share of the polynomial function of one of the share result computation systems. The allocatable share is a member of a set of allocatable shares generated from the polynomial function by a share allocation system. Each of the allocatable shares is distributed to a unique share result computation system in the one or more share result computation systems. Each allocatable share includes a share element for each coefficient in the polynomial function. The share elements for a coefficient across the share result computation systems sum to the coefficient. A generating operation 404 generates the reconstruction share result from a combination of the one or more reconstruction share results.

Figure 5:
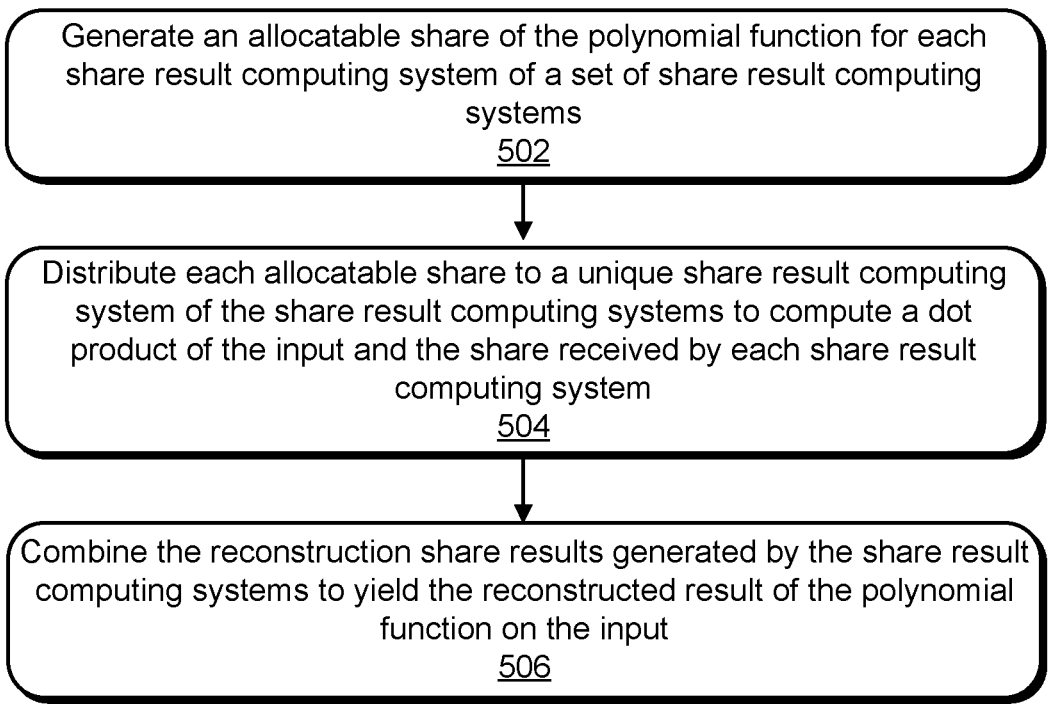
FIG. 5 illustrates example operations for polynomial function secret sharing at a share allocation system.

FIG. 5 illustrates example operations 500 for polynomial function secret sharing at a share allocation system. A generating operation 502 generates an allocatable share of the polynomial function for each share result computation system of a set of share result computation systems. Each allocatable share includes a share element for each coefficient in the polynomial function. The share elements for a coefficient across the share result computation systems sum to the coefficient. A distribution operation 504 distributes each allocatable share to a unique share result computation system of the share result computation systems to compute a dot product of the input and the share received by each share result computation system. A combination of the reconstruction share results generated by the share result computation systems yields a reconstructed result of the polynomial function on the input, in a combination operation 506.

Figure 6:
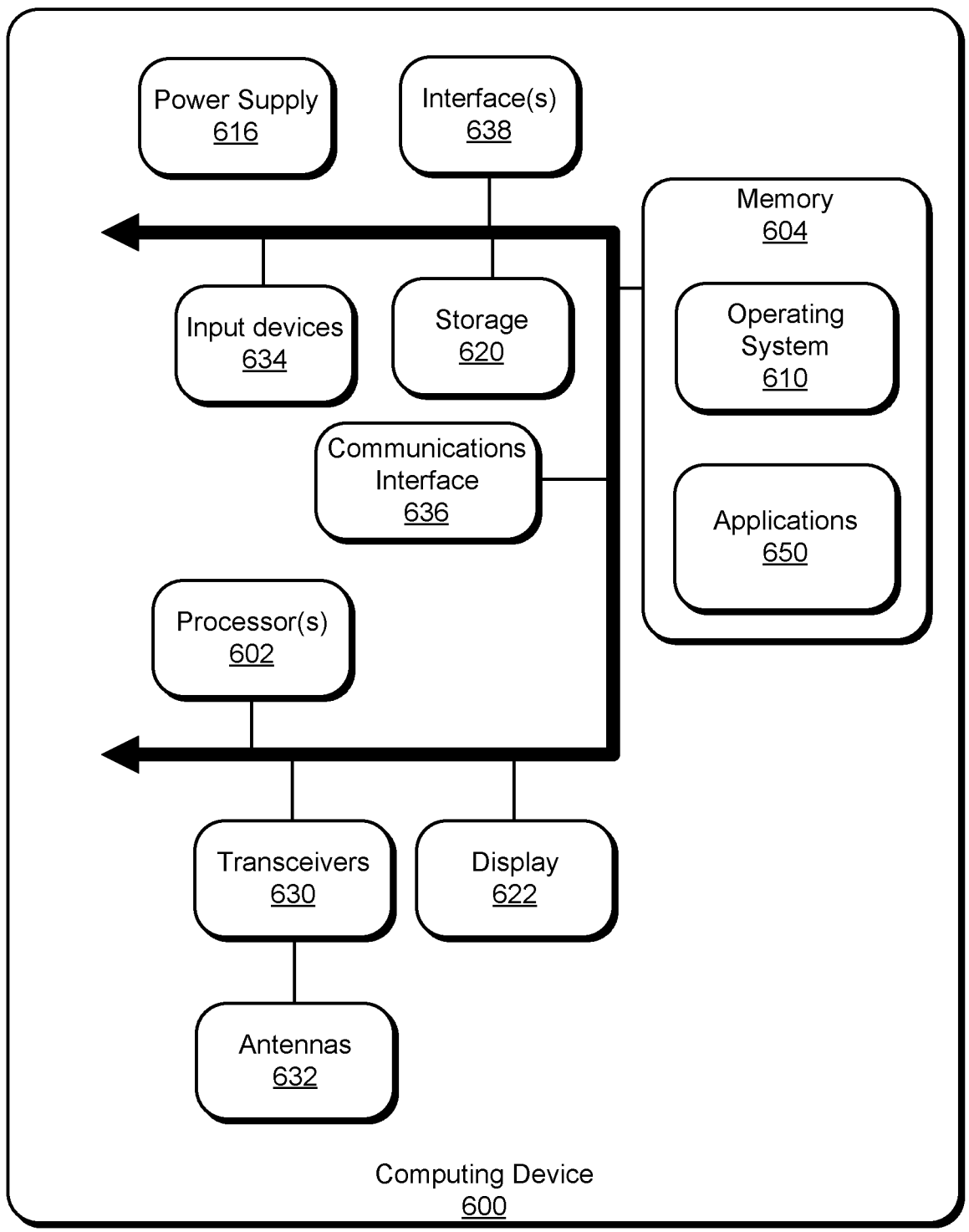
FIG. 6 illustrates an example computing device for implementing the features and operations of the described technology.

FIG. 6 illustrates an example computing device 600 for implementing the features and operations of the described technology. The computing device 600 may embody a remote control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 600 includes one or more hardware processor(s) 602 and a memory 604. The memory 604 generally includes both volatile memory (e.g., RAM) and nonvolatile memory (e.g., flash memory). An operating system 610 resides in the memory 604 and is executed by the hardware processor(s) 602.

In an example computing device 600, as shown in FIG. 6, one or more modules or segments, such as applications 650, a share allocation system, a share result computation system, a reconstruction system, and other services, workloads, and modules, are loaded into the operating system 610 on the memory 604 and/or storage 620 and executed by hardware processor(s) 602. The storage 620 may include one or more tangible storage media devices and may store program code, code-based keys, code-based signatures, verification operands, verification results, allocatable shares, reconstruction share results, reconstructed results, and other data and may be local to the computing device 600 or may be remote and communicatively connected to the computing device 600.

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630 that may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a network adapter 636, which is a type of computing device. The computing device 600 may use the adapter and any other types of computing devices for establishing connections over a wide-area network (WAN) or local-area network (LAN). It should be appreciated that the network connections shown are exemplary and that other computing devices and means for establishing a communications link between the computing device 600 and other devices may be used.

The computing device 600 may include one or more input devices 634 such that a user may enter commands and information (e.g., a keyboard or mouse). These and other input devices may be coupled to the server by one or more interfaces 638, such as a serial port interface, parallel port, or universal serial bus (USB). The computing device 600 may further include a display 622, such as a touch screen display.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more hardware processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote control device and/or a physical controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across multiple user sessions. A service may be available to one or more system components, programs, and/or other services. In some implementations, a service may run on one or more server computing devices.

While this specification contains many specific implementation details, these should not be construed as limitations on the scope of any inventions or of what may be claimed, but rather as descriptions of features specific to particular embodiments of particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A computing-processor-implemented method of polynomial function secret sharing by share result computation systems participating in computation of reconstruction share results for a polynomial function evaluated on input data, the computing-processor-implemented method comprising:
receiving an allocatable share of the polynomial function at a first computing system of the share result computation systems, the allocatable share being a member of a set of allocatable shares generated from the polynomial function, each of the allocatable shares being distributed to a unique share result computation system of the share result computation systems, each allocatable share including a share element for each coefficient in the polynomial function, the share elements for a coefficient of the polynomial function equaling evaluations of a randomly chosen polynomial and the share elements for the coefficient across the share result computation systems being reconstructable to the coefficient via polynomial interpolation;
generating a reconstruction share result at the first computing system by computing a dot product of the input data and the allocatable share received by the first computing system, wherein a combination of the reconstruction share results generated by the share result computation systems yields a reconstructed result of the polynomial function evaluated on the input data; and
transmitting the reconstruction share result to another computing system for computation of the reconstructed result.

2. The computing-processor-implemented method of claim 1, wherein the combination includes Lagrange interpolation of a proper subset of the reconstruction share results generated by the share result computation systems.

3. The computing-processor-implemented method of claim 1, wherein reconstruction share results from fewer than all of the share result computation systems participating in computation of reconstruction share results for the polynomial function evaluated on the input data are required to generate the reconstructed result of the polynomial function evaluated on the input data.

4. The computing-processor-implemented method of claim 1, wherein each coefficient is a member of a Galois field.

5. A computing-processor-implemented method of polynomial function secret sharing in computation of reconstruction share results for a polynomial function evaluated on input data, the computing-processor-implemented method comprising:
generating an allocatable share of the polynomial function for each share result computation system of a set of share result computation systems, each allocatable share including a share element for each coefficient in the polynomial function, the share elements for a coefficient of the polynomial function equaling evaluations of a randomly chosen polynomial and the share elements for the coefficient across the share result computation systems being reconstructable to the coefficient; and
distributing each allocatable share to a unique share result computation system of the share result computation systems to compute a dot product of the input data and the share received by each share result computation system, wherein a combination of the reconstruction share results generated by the share result computation systems yields a reconstructed result of the polynomial function evaluated on the input data.

6. The computing-processor-implemented method of claim 5, further comprising:
combining the reconstruction share results generated by the share result computation systems to yield the reconstructed result of the polynomial function evaluated on the input data.

7. The computing-processor-implemented method of claim 5, wherein the combination includes Lagrange interpolation of a proper subset of the reconstruction share results generated by the share result computation systems.

8. The computing-processor-implemented method of claim 5, wherein reconstruction share results from fewer than all of the share result computation systems participating in computation of reconstruction share results for the polynomial function evaluated on the input are required to generate the reconstructed result of the polynomial function evaluated on the input data.

9. The computing-processor-implemented method of claim 5, wherein each coefficient is a member of a Galois field.

10. The computing-processor-implemented method of claim 5, wherein each share element of each allocatable share is computed as a Shamir share, each share element corresponding to a coefficient of the polynomial function.

11. The computing-processor-implemented method of claim 5, wherein the share elements for the coefficient across the share result computation systems are reconstructable to the coefficient via polynomial interpolation.

12. A system for polynomial function secret sharing by share result computation systems participating in computation of reconstruction share results for a polynomial function evaluated on input data, the system comprising:
one or more hardware processors;
a communication interface configured to receive an allocatable share of the polynomial function, the allocatable share being a member of a set of allocatable shares generated from the polynomial function, each of the allocatable being distributed to a unique share result computation system of the share result computation systems, each allocatable share including a share element for each coefficient in the polynomial function, the share elements for a coefficient across the share result computation systems being reconstructable to the coefficient; and
a share result computation system executable by the one or more hardware processors and configured to generate a reconstruction share result by computing a dot product of the input data and the allocatable share received by the communication interface, wherein a combination of the reconstruction share results generated by the share result computation systems yields a reconstructed result of the polynomial function evaluated on the input data, wherein the communications interface is further configured to transmit the reconstruction share result to another computing system for computation of the reconstructed result.

13. The system of claim 12, wherein the combination includes Lagrange interpolation of a proper subset of the reconstruction share results generated by the share result computation systems.

14. The system of claim 12, wherein reconstruction share results from fewer than all of the share result computation systems participating in computation of reconstruction share results for the polynomial function on input are required to generate the reconstructed result of the polynomial function evaluated on the input data.

15. The system of claim 12, wherein each coefficient is a member of a Galois field.

16. The system of claim 12, wherein the share elements for a coefficient of the polynomial function equaling evaluations of a randomly chosen polynomial.

17. The system of claim 12, wherein the share elements for the coefficient across the share result computation systems are reconstructable to the coefficient via polynomial interpolation.

* * * * *